United States Patent [19]

Tada et al.

[11] Patent Number: 4,568,719

[45] Date of Patent: Feb. 4, 1986

[54] RESIN COMPOSITION

[75] Inventors: Hisashi Tada; Masahiro Saruta; Hideki Moriishi, all of Nagoya, Japan

[73] Assignee: Mitsubishi Rayon Co., Ltd., Tokyo, Japan

[21] Appl. No.: 615,150

[22] Filed: May 30, 1984

[30] Foreign Application Priority Data

May 30, 1983 [JP] Japan ............................. 58-95316
May 30, 1983 [JP] Japan ............................. 58-95317

[51] Int. Cl.$^4$ ............................................. C08L 67/06
[52] U.S. Cl. ............................... 525/28; 525/111; 525/531; 525/107; 525/108
[58] Field of Search ............... 525/28, 531, 107, 111, 525/108

[56] References Cited

U.S. PATENT DOCUMENTS

| | | | |
|---|---|---|---|
| 3,478,126 | 11/1969 | Turpin | 525/531 |
| 3,649,599 | 3/1972 | Swanson et al. | 528/28 |
| 3,795,657 | 3/1974 | Howsam et al. | 525/107 |
| 3,966,681 | 6/1976 | Maeda et al. | 525/531 |
| 4,017,434 | 4/1977 | Suzui et al. | 525/111 |
| 4,131,715 | 12/1978 | Frankel | 525/531 |
| 4,172,060 | 10/1979 | Dalibor et al. | 525/28 |
| 4,296,215 | 10/1981 | Markrewitz | 525/28 |
| 4,309,473 | 1/1982 | Minamisawa et al. | 525/531 |
| 4,322,508 | 3/1982 | Peng et al. | 525/111 |
| 4,348,506 | 9/1982 | Ganguli et al. | 525/531 |

*Primary Examiner*—Paul R. Michl
*Assistant Examiner*—Alex H. Walker
*Attorney, Agent, or Firm*—Oblon, Fisher, Spivak, McClelland & Maier

[57] ABSTRACT

A resin composition comprising (I) at least one compound selected from the group consisting of hydroxyl-containing unsaturated polyesters, reaction products of polyepoxides and ethylenically unsaturated carboxylic acids and β-polymers of diallyl phthalate (II) at least one monomer copolymerizable with said compound (I), which is selected from the group consisting of ethylenically unsaturated monomers and allylic unsaturated monomers, (III) a catalyst capable of polymerizing (I) and (II), (IV) at least one compound containing the oxirane ring, (V) a curing agent (excluding acid anhydrides, acids and amine compounds) capable of curing said compound (IV), and (VI) a catalyst capable of promoting the curing of (IV) by (V). A preferable composition further contains (VII) a polyisocyanate compound and (VIII) a promoter for the reaction between isocyanate group and hydroxyl group. The composition may contain fibrous reinforcing agents.

21 Claims, 10 Drawing Figures ns of the radical-polymerization type such as
RESIN COMPOSITION This invention relates to a resin composition excellent in quick curability accompanied with reduced heat of curing and in adhesive strength.

Resins of the radical-polymerization type such as unsaturated polyester resins, vinyl ester resins, and diallyl phthalate resins have been known to form a resin composition of excellent quick curability and are widely used especially in the field of fiber-reinforced plastics (FRP). Although excellent in quick curability, these resin compositions have disadvantages in that they give a cured product of inferior toughness and insufficient adhesive strength. For the purpose of improving these properties, there have been known various attempts including an example in which the terminal group is converted into a carboxyl or hydroxyl group and a mixture of the resulting resin with an epoxy resin is cured in the presence of an acid anhydride and another example in which use is made of a composition comprising an unsaturated polyester resin and a mixture of curing agents comprising maleic anhydride, an epoxy resin and an imidazole compound. Although such combinations result in a certain degree of improvement, yet they exhibit a disadvantage of low rate of curing because the reaction between an acid anhydride and an epoxy resin is a rate-controlling factor for the curing.

The present inventors made an extensive study on the resin composition which is satisfactory in both the quick curability and the adhesive strength and, as a result, have accomplished the present invention. In addition, the resin composition according to the present invention generated a reduced amount of the heat of curing.

The present invention provides a resin composition excellent in quick curability and adhesive strength, comprising, as described below in detail, (I) at least one compound selected from the group consisting of (A) unsaturated polyesters containing hydroxyl group, (B) reaction products of polyepoxides and ethylenically unsaturated carboxylic acids, and (C) β-polymers of diallyl phthalate, (II) at least one monomer copolymerizable with said compound (I), which is selected from the group consisting of ethylenically unsaturated monomers and unsaturated allylic monomers, (III) a catalyst for the copolymerization of compounds (I) and (II), (IV) at least one compound containing the oxirane ring, (V) a curing agent (excluding acid anhydrides, acids and amine compounds) capable of curing the compound (IV), and (VI) a catalyst capable of promoting the curing of compounds (IV) and the activity of curing agent (V), further in addition to the above components, (VII) a polyisocyanate compound and (VIII) a promoter for the reaction between the isocyanate group and the hydroxyl group.

As the unsaturated polyesters (A) for use in the present composition, mention may be made of those prepared from the known raw materials by the known methods, such as those containing hydroxyl group, which are obtained by the dehydration condensation from unsaturated dibasic carboxylic acids (e.g. fumaric acid and maleic acid) or anhydride thereof, saturated dibasic carboxylic acids or anhydrides thereof (e.g. phthalic acid, isophthalic acid, adipic acid, phthalic anhydride, succinic anhydride, tetrahydrophthalic anhydride, and hexahydrophthalic anhydride), and glycol components such as diethylene glycol, propylene glycol, neopentyl glycol, butanediol, hydrogenated bisphenol A, and 2,2-di-(4-hydroxypropoxyphenol)propane. An unsaturated polyester obtained from maleic acid and phthalic acid or a derivative of them is preferably used.

The polyepoxides used in the reaction with an ethylenically unsaturated carboxylic acid to form the reaction product (B) are limited to no special species. As examples of suitable polyepoxides, mention may be made of polyglycidyl ethers of diphenylolalkanes such as diphenylolpropane, diphenylolethane, and diphenylolmethane; polyglycidyl ethers of polyhydric phenols such as novolak and resol; polyglycidyl substituted p-aminophenol, m-aminophenol, and polyamines such as 4,4′-di-aminodiphenylmethane; epoxy resins produced by the epoxidation of alicyclic compounds such as cyclohexene, cyclopentadiene, and dicyclopentadiene; polycepoxyalkyl)ethers of aliphatic polyepoxy compounds such as 3,4-epoxy-6-methylcyclohexanecarboxylic acid methyl ester, ethylene glycol, and glycerol; and glycidyl esters of aromatic and aliphatic carboxylic acids. Intermediate reaction products of these polyepoxides and an amine compound or a carboxylic acid anhydride may also be used.

As examples of ethylenically unsaturated carboxylic acids, mention may be made of methacrylic acid, acrylic acid, and crotonic acid. In the reaction between a polyepoxide and an ethylenically unsaturated carboxylic acid, the molar ratio between the epoxy group and the carboxylic acid is preferably from 1:0.5 to 1:1.1. The reaction can be carried out by a known procedure (for example, the procedure described in Japanese Patent Publication No. 31,472/69). It is quite feasible to use a combination of the compounds (A) and (B).

As the ethylenically unsaturated monomers or allylic unsaturated monomers, mention may be made of styrene derivatives such as styrene, vinyltoluene, and chlorostyrene; methacrylates and acrylates such as methyl methacrylate, methyl methacrylate dimer, methyl acrylate, glycidyl acrylate, and glycidyl methacrylate; and allyl esters such as diallyl phthalate, triallyl cyanurate, and triallyl isocyanurate.

As the catalysts (III) for the copolymerization of the compounds (I) and (II), there may be mentioned those peroxides which are active at moderate to high temperatures, such as benzoyl peroxide and tertbutyl perbenzoate and those peroxides which are active at ambient to moderate temperatures, such as methyl ethyl ketone peroxide and cyclohexanone peroxide. Dialkyl peroxides such as dicumyl peroxide are suitable especially when the resin composition contains a nitrogen compound.

As the compounds (IV) containing at least one oxirane ring, there may be mentioned, in addition to the polyepoxides mentioned above, monoepoxy compounds such as styrene oxide, butyl glycidyl ether, allyl glycidyl ether, and phenyl glycidyl ether.

As the curing agents (V) (excluding acid anhydrides, acids, and amine compounds) capable of curing the compound (IV), mention may be made of guanidines such as dicyandiamide, 2,6-xylenyl biguanide, o-tolyl biguanide, diphenylguanidine, and di-o-tolylguanidine; and dihydrazides such as adipyl dihydrazide and azelayl dihydrazide.

As the catalyst (VI) for the reaction of the components (IV) and (V), mention may be made of the compounds represented by the general formula

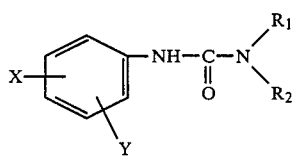

wherein X and Y are each Cl, Br, CH₃, OCH₃, OC₂H₅, NO₂, H, or

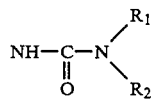

and R₁ and R₂ represent an alkyl group, alkyl group, alkoxy group, alkenyl group, aralkyl group, or an alicyclic compound containing both R₁ and R₂. Examples are N-(3-chloro-4-methoxyphenyl)-N',N'-dimethylurea, N-(4-chlorophenyl)-N',N'-dimethylurea, N-(3-chloro-4-ethylphenyl)-N',N'-dimethylurea, N-(4-chlorophenyl)-N',N'-dipropylurea, N-(3-chloro-4-methylphenyl)-N',N'-dimethylurea, N-(3,4-dichlorophenyl)-N',N'-dimethylurea, N-(4-methyl-3-nitrophenyl)-N',N'-dimethylurea, N-(3-chloro-4-methylphenyl)-N'N'-dimethylurea N-(3-chloro-4-ethylphenyl)-N',N'-dimethylurea, N-(4-ethoxyphenyl)-N',N'-dimethylurea, N-(3-chloro-4-methoxyphenyl)-N',N'-dimethylurea, N-(4-methyl-3-nitrophenyl)-N',N'-dimethylurea, N-(4-chlorophenylcarbamoyl)piperadine, N-(4-chlorophenylcarbamoyl)morpholine, and N-(4-chlorophenylcarbamoyl)-pyrrolidine. Other catalysts such as boron trifluoride, amine complexes, boron trichloride-amine complexes, and amine compounds such as, for example, monoethylamine and benzylamine may also be used. Those catalysts which do not contain free amines, acid anhydrodes, or carboxylic acids can be used without any special exception.

As the polyisocyanates (VII), mention may be made of crude or purified aromatic or aliphatic polyisocyanates such as 4,4'-diphenylmethanediisocyanate, 2,4-toluenediisocyanate, 2,6-toluenediisocyanate, hexamethylenediisocyanate, and m-xylylenediisocyanate.

As the promoters (VIII), mention may be made of those which generally promote the reaction between an isocyanate and the alcoholic hydroxyl group. The coexistence of a tertiary amine is undesirable. Suitable promoters are organotin compounds such as dibutyltin dilaurate and tin octoate and metal naphthenates such as lead naphthenate and cobalt naphthenate, though not limited thereto.

The ratios of (I)/(II)/(III) in the present composition are similar to those required for the general radical polymerization systems and are in the range of 0–100/1–100–0/0.1–5, preferably 40–95/60–5/0.3–4, most preferably 70–90/30–10/0.5–3. If the proportion of the catalyst (III) is less than 0.1, a sufficient rate of curing is not attained, whereas if it exceeds 5, the curing proceeds too rapidly beyond the suitable rate. The ratios (IV)/(V)/(VI) are those which meet the necessary conditions for the curing of epoxy resins and are in the range of 100/0–50/0–10, preferably 100/0–25/0–5, most preferably 100/0–10/2–5. A suitable compounding ratio of the mixture (I)/(II)/(III) to the mixture (IV)/(V)/(VI) is in the range of from 97–3 to 3–97. If the proportion of the latter mixture is less than 3, the adhesive strength becomes insufficient, whereas if it exceeds 97, the rapid curability becomes adversely affected; a preferable ratio is 97–40/3–60. The proportion of the polyisocyanate compound (VII) relative to the mixture of components (I) to (VI) can be optionally selected so long as the functional group ratio OH/NCO remains in the range 1:0.1–1. By adjusting the proportion of (VII) it is possible to control the stiffness and the tackiness of the composition. The proportion of the promoter (VIII) is preferably 0 to 5 parts for 100 parts of the mixture of components (I) to (VII). The sole role of the promoter (VIII) is to control the rate of reaction between the hydroxyl group and the isocyanate group and it should be added in a small amount in view of not to diminish the physical properties of the cured composition. Although the order of mixing of the components is optional, it is suitable for the tackiness and mold flow of the composition to add (IV), (V) and (VI) to the premixture of (I), (II), (III), (VII) and (VIII).

The resin composition thus prepared is preferably thickened before use by standing at a temperature from room temperature to 60° C., preferably from room temperature to 40° C. In the case where reinforcing fibers, fillers, or additives are used, it is necessary to add such materials to the composition before thickening to assure thorough impregnation with the composition.

The reinforcing fibrous materials include inorganic fibers such as glass fiber, alumina fiber, silicon carbide fiber, boron fiber, or carbon fiber and organic fibers such as polyester fiber and polyamide fiber, which are in any form, such as filament, cut fiber, undirectionally oriented tape or sheet, mat, cloth, nonwoven paper sheet, or cord. If necessary, the composition is incorporated with powdered fillers such as glass, silica, alumina, quartz, mica, calcium carbonate, barium sulfate, and clay in an amount of 5 to 70% by weight based on total weight. It is also possible, if necessary, to add various colorants and release agents such as zinc stearate, phosphates, or alcohols. Other polymers such as homo- or co-polymer of styrene, ethylene, or a methacrylate ester may be added in an amount of 0 to 30% by weight based on total weight. The impregnation of reinforcing fibers, fillers, and additives can be performed in any of the known ways such as the lacquer technique employing a solvent and the hot melt technique without using a solvent. The solvents, if used, should be inert to the reaction, such as, for example, acetone, methyl ethyl ketone, methylene chloride, chloroform, trichloroethylene, dioxane, tetrahydrofuran, benzene, and toluene.

The resin composition of the present invention has more desirable curability as well as superior adhesiveness to various materials than those of the conventionally known compositions and has a high practical value.

The invention is illustrated below in detail with reference to Examples, wherein all parts are by weight. The accompanying drawings which are referred to in Examples are briefly described below.

Figure 1:
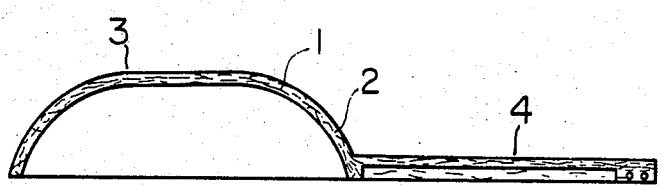
FIG. 1 is a side view of a pressing tool for use in roentgenoscopic diagnosis.

The numerical symbols in the drawings represent the following:
1 Carbon fiber.
2 Resin matrix.
3 Semispherical shell of the pressing tool.
4 Arm.
5 Pressure cylinder.
6 Feeding pot.
7 Top portion of the main part.
8 Rod-like portion of the leg.
9 Slide core.
10 Upper mold.
11 Lower mold.

EXAMPLE 1

A mixture of 50 moles of maleic anhyride and 108 moles of diethylene glycol was esterified at 140° to 230° C. for 3.5 hours. After addition of 50 moles of phthalic anhydride and 0.02 part of hydroquinone to the reaction mixture, the resulting mixture was subjected to esterification at 140° to 230° C. for 3.1 hours to yield an unsaturated polyester having an acid value of 54.5 and an unsaturated acid content of 19.8%. To 100 parts of the resulting unsaturated polyester, were added 7 parts of diallyl phthalate monomer and 3 parts of tertbutyl perbenzoate. The resulting mixture was milled on a 3-roll mill at 50° C. for 30 minutes to obtain composition (a).

A mixture of 100 parts of an epoxy resin of the bisphenol A glycidyl ether type, 5 parts of dicyandiamide, and 3 parts of 1-(3,4-dichlorophenyl)-3,3-dimethylurea was milled in a "Homomixer" for 30 minutes to obtain composition (b).

To the composition (a), was added 7 parts of polymethylenepolyphenylisocyanate (viscosity, 150 cps at 25° C.; NCO content, 31%) followed by 0.3 part of dibutyltin dilaurate. After thorough mixing, the mixture was left standing at room temperature for 20 hours. The mixture was then mixed with the composition (b) in varied ratios as shown in Table 1. The resulting compositions (A) were allowed to ripen in a tightly closed vessel at 40° C. for 48 hours to obtain compositions (B) having characteristics as shown in Table 1.

TABLE 1

| | Ratio (b)/(a) | Tackiness | Tmax in gelation* (°C.) | Gel time* (min.) |
|---|---|---|---|---|
| B-1 | 4/96 | Low | 190 | 1.0 |
| B-2 | 25/75 | Low | 170 | 1.3 |
| B-3 | 65/35 | High | 160 | 4.0 |
| B-4 | 80/20 | High | 150 | 9.5 |
| B-5 | 0/100 | Low | 250 | 0.9 |

Note:
*Tested at 140° C.

EXAMPLE 2

To 95 parts of an epoxy resin of the bisphenol A diglycidyl ether type (epoxy equivalent, 190), were added 39 parts of methacrylic acid, 0.7 part of lithium chloride and 0.05 part of hydroquinone. The mixture was allowed to react at 100° C. to yield a vinyl ester. A mixture was prepare by adding 40 parts of styrene and 2.5 parts of tert-butyl perbenzoate to 60 parts of the vinyl ester obtained above. To the mixture, were added 10 parts of polymethylenepolyphenylisocyanate (viscosity, 150 cps at 25° C.; NCO content, 31%) and 0.3 part of dibutyltin dilaurate. The resulting mixture was thoroughly stirred to obtain composition (m'). Another composition (n) was prepared by milling 100 parts of the above epoxy resin, 5 parts of dicyandiamide, and 3 parts of 1-(3,4-dichlorophenyl)-3,3-dimethylurea in a "Homomixer" for 30 minutes. The composition (m') was left standing at room temperature for 20 hours and mixed with the composition (n) in varied ratios as shown in Table 2. The resulting composition (C) were allowed to ripen in a tightly closed vessel at 40° C. for 48 hours to obtain resin compositions (D) having characteristics as shown in Table 2.

TABLE 2

| | Ratio (n)/(m') | Tackiness | Tmax in gelation* (°C.) | Gel time* (min.) |
|---|---|---|---|---|
| D-1 | 4/96 | Low | 190 | 0.7 |
| D-2 | 25/75 | Low | 180 | 0.9 |
| D-3 | 65/35 | High | 170 | 2.6 |
| D-4 | 80/20 | High | 150 | 8.0 |
| D-5 | 0/100 | Low | 250 | 0.7 |

Note:
*Tested at 140° C.

EXAMPLE 3

To 95 parts of a novolac-type epoxy resin ("Epi-Kote 152" of Shell Chemical Co.; epoxy equivalent, 175), were added 42 parts of methacrylic acid, 0.7 part of lithium chloride, and 0.05 part of hydroquinone. The mixture was allowed to react at 100° C. to yield a vinyl ester. A mixture was prepared by adding 40 parts of styrene and 2.9 parts of tert-butyl perbenzoate to 60 parts of the vinyl ester obtained above. To the mixture, were added 10 parts of polymethylenepolyphenylisocyanate (viscosity, 150 cps at 25° C.; NCO content, 31%) and 0.3 part of dibutyltin dilaurate. The resulting mixture was thoroughly stirred to obtain composition (O). Another composition (P) was prepared by milling 100 parts of a diglycidyl phthalate-type epoxy resin (epoxy equivalent, 154), 5 parts of dicyandiamide, and 3 parts of 1-(3,4-dichlorophenyl)-3,3-dimethylurea in a "Homomixer" for 30 minutes. The compositions (O), which had been left standing at room temperature for 20 hours, and (P) were mixed in varied ratios as shown in Table 3. The resulting compositions (E) were allowed to ripen in a tightly closed vessel at 40° C. for 48 hours to obtain resin compositions (F) having characteristics as shown in Table 3.

TABLE 3

| | Ratio (P)/(O) | Tackiness | Tmax in gelation (°C.) | Gel time (min.) |
|---|---|---|---|---|
| F-1 | 4/96 | Low | 190 | 0.8 |
| F-2 | 25/75 | Low | 170 | 1.3 |
| F-3 | 65/35 | High | 150 | 3.4 |
| F-4 | 80/20 | High | 130 | 9.5 |
| F-5 | 0/100 | Low | 250 | 0.7 |

EXAMPLE 4

In the same manner as in Example 3, compositions (O) and (P) were prepared. The composition (O), immediately after preparation, was mixed with the composition (P) in varied ratios to obtain compositions (E') which were then ripened in a tightly closed vessel at 40° C. for 48 hours to yield resin compositions (F') having characteristics as shown in Table 4.

TABLE 4

|  | Ratio (P)/(O) | Tackiness | Tmax in gelation (°C.) | Gel time* (min.) |
| --- | --- | --- | --- | --- |
| F'-1 | 4/96 | Low | 210 | 1.2 |
| F'-2 | 25/75 | High | 180 | 2.4 |
| F'-3 | 65/35 | High | 170 | 4.5 |
| F'-4 | 80/20 | High | 150 | 11.0 |

Note:
*Tested at 140° C.

COMPARATIVE EXAMPLE 1

A mixture of 144 parts of the vinyl ester obtained in Example 2 and 98 parts of maleic anhydride was allowed to react at 100° C. for about one hour to form a half ester of maleic acid. To 60 parts of the reaction product, was added 40 parts of styrene, then 2.9 parts of tert-butyl perbenzoate, and finally 5 parts of magnesium oxide to yield composition (q). The composition (n) prepared in Example 2 was mixed with the composition (q) in a ratio of 25/75 (composition of the n/q type). This composition and the composition of the n/m' type (n/m'=25/75) prepared in Example 2 were left standing at 40° C. for 12, 24, 48, 72, 96 and 192 hours. The thickening characteristics were as shown in Table 5.

TABLE 5

| compo-sition | | Change in tackiness and stiffness with time of standing | | | | | |
| --- | --- | --- | --- | --- | --- | --- | --- |
| | | 12 hr | 24 hr | 48 hr | 72 hr | 96 hr | 192 hr |
| n/m' type | tacki-ness | High | Medium | Low | Low | Low | Low |
| | Stiff-ness | Soft | Medium | | suitable | | |
| n/q type | tacki-ness | High | High | High | Medium | Low | Low |
| | Stiff-ness | Soft | Soft | Soft | Soft | Hard | Very hard |

EXAMPLE 5

Chopped strand glass fiber mat (120 parts) was impregnated with a mixture of 100 parts of the composition (A) [the ratio (b)/(a) was as shown in Table 6] prepared in Example 1 and 3 parts of zinc stearate. The impregnated mat was left standing in a tightly closed vessel at 40° C. for 48 hours to obtain SMC of low tackiness. The SMC thus obtained was cured under the molding conditions as shown in Table 6 and tested for flexural strength and modulus of elasticity in flexure in accordance with ASTM D 790-71 and for interlaminar shear strength (I.L.S.S.) in accordance with ASTM D 2344-76. The results obtained were as shown in Table 6.

TABLE 6

| Ratio (b)/(a) | Easiness on handling | Flexural strength (kg/mm$^2$) | Modulus of elasticity in flexure (kg/mm$^2$) | I.L.S.S. (kg/mm$^2$) | Molding conditions *1, *2 (min.) |
| --- | --- | --- | --- | --- | --- |
| 4/96 | Good | 39.2 | 1310 | 6.5 | 5 |
| 25/75 | Good | 40.4 | 1660 | 7.0 | 5 |
| 65/35 | Fair to poor | 43.0 | 1740 | 7.0 | 5 |

TABLE 6-continued

| Ratio (b)/(a) | Easiness on handling | Flexural strength (kg/mm$^2$) | Modulus of elasticity in flexure (kg/mm$^2$) | I.L.S.S. (kg/mm$^2$) | Molding conditions *1, *2 (min.) |
| --- | --- | --- | --- | --- | --- |
| 80/20 | Fair to poor | 45.0 | 1810 | 7.0 | 10 |
| 0/100 | Good | 25.4 | 1040 | 4.0 | 5 |

Note:
*1 Mold temperature: 135° C.; molding pressure: 30 kg/cm$^2$
*2 Post Cure: 130° C., 2 hours

EXAMPLE 6

In a manner similar to that in Example 5, SMC of the chopped strand glass fiber prepared using a mixture of 100 parts of the composition (C) of Example 2, in which the composition (n) was mixed in varied (n)/(m') ratio as shown in Table 7, and 3 parts of zinc stearate. The molded SMC was tested for flexural strength, modulus of elasticity in flexure, and I.L.S.S. The results obtained were as shown in Table 7.

TABLE 7

| Ratio (n)/(m') | Easiness on handling | Flexural strength (kg/mm$^2$) | Modulus of elasticity in flexure (kg/mm$^2$) | I.L.S.S. (kg/mm$^2$) | Molding conditions *1, *2 (min.) |
| --- | --- | --- | --- | --- | --- |
| 4/96 | Good | 46.5 | 1914 | 6.5 | 5 |
| 25/75 | Good | 48.5 | 2005 | 7.5 | 5 |
| 65/35 | Fair to poor | 49.8 | 2117 | 7.5 | 5 |
| 80/20 | Fair to poor | 51.3 | 2211 | 75 | 10 |
| 0/100 | Good | 39.1 | 1614 | 4.0 | 5 |

Note:
*1 Mold temperature: 135° C.; molding pressure: 30 kg/cm$^2$
*2 Post Cure: 130° C., 2 hours

EXAMPLE 7

The composition (O) prepared in Example 3 was left standing at room temperature for 20 hours and mixed with the composition (P) in varied ratios as shown in Table 8 to obtain composition (E). In a manner similar to that in Example 5, chopped strand glass fiber mat was impregnated with a mixture of 100 parts of the composition (E) and 3 parts of zinc stearate to obtain SMC. The molded SMC was tested for flexural strength, modulus of elasticity in flexure, and I.L.S.S. The results obtained were as shown in Table 8.

TABLE 8

| Ratio (P)/(O) | Easiness on handling | Flexural strength (kg/mm$^2$) | Modulus of elasticity in flexure (kg/mm$^2$) | I.L.S.S. (kg/mm$^2$) | Molding conditions *1, *2 (min.) |
| --- | --- | --- | --- | --- | --- |
| 4/96 | Good | 48.5 | 2012 | 7.0 | 5 |
| 25/75 | Good | 51.9 | 2120 | 8.5 | 5 |
| 65/35 | Good | 52.9 | 2215 | 8.5 | 5 |
| 80/20 | Fair to poor | 54.2 | 7300 | 8.5 | 10 |
| 0/100 | Good | 42.4 | 1733 | 5.0 | 5 |

Note:
*1 Mold temperature: 135° C.; molding pressure: 30 kg/cm$^2$
*2 Post Cure: 130° C., 2 hours

EXAMPLE 8

A resin composition was prepared by mixing 100 parts of the composition (A) of Example 1 and 3 parts of "Zelec UN" (Trademark for an unneutralized phosphated alcohol of Du Pont Co.). The resulting composition was spread by means of a common SMC (sheet molding compound) machine. Carbon fiber "Pyrofil EAS" (Trademark for Mitsubishi Rayon Co.) 10000 fil, which being cut to 25 mm in length, was strewed over the spread composition and the strewed fiber was covered with spread composition to impregnate the fiber with the composition. The resulting impregnated material was left standing in a tightly closed vessel at 40° C. for 48 hours to obtain SMC of low tackiness which contained 50% by weight of carbon fiber. The SMC was cured under molding conditions as shown in Table 9 and tested for flexural strength and modulus of elasticity in accordance with ASTM D 790-71 and for I.L.S.S. in accordance with ASTM D 2344-76. The results obtained were as shown in Table 9.

TABLE 9

| Ratio (b)/(a) | Easiness on handling | Flexural strength (kg/mm$^2$) | Modulus of elasticity in flexure (kg/mm$^2$) | I.L.S.S. (kg/mm$^2$) | Molding conditions *1, *2 (min.) |
|---|---|---|---|---|---|
| 4/96 | Good | 43.5 | 2600 | 5.0 | 5 |
| 25/75 | Good | 45.5 | 2650 | 7.5 | 5 |
| 65/35 | Fair to poor | 46.0 | 2700 | 7.8 | 5 |
| 80/20 | Fair to poor | 46.5 | 2750 | 7.7 | 10 |
| 0/100 | Good | 30.5 | 2400 | 4.1 | 5 |

Note:
*1 Mold temperature: 135° C.; molding pressure: 30 kg/cm$^2$
*2 Post Cure: 130° C., 2 hours

EXAMPLE 9

Compositions (n) and (m') of Example 2 were mixed in varied ratios as shown in Table 10 to obtain compositions (C). SMC containing carbon fiber was prepared as in Example 8 by using a mixture of 100 parts of the composition (C) and 1.5 parts of "Zelec UN". The SMC was molded and tested for flexural strength, modulus of elasticity in flexure, and I.L.S.S. The results obtained were as shown in Table 10.

TABLE 10

| Ratio (n)/(m') | Easiness on handling | Flexural strength (kg/mm$^2$) | Modulus of elasticity in flexure (kg/mm$^2$) | I.L.S.S. (kg/mm$^2$) | Molding conditions *1, *2 (min.) |
|---|---|---|---|---|---|
| 4/96 | Good | 47.5 | 3700 | 5.7 | 5 |
| 25/75 | Good | 48.0 | 4000 | 8.0 | 5 |
| 65/35 | Fair to poor | 50.0 | 4100 | 8.1 | 5 |
| 80/20 | Fair to poor | 51.5 | 4200 | 8.5 | 10 |
| 0/100 | Good | 38.0 | 3000 | 4.2 | 5 |

Note:
*1 Mold temperature: 135° C.; molding pressure: 30 kg/cm$^2$
*2 Post Cure: 130° C., 2 hours

EXAMPLE 10

Compositions (P) and (O) of Example 3 were mixed in varied ratios as shown in Table 11 to obtain compositions (E). SMC containing carbon fiber was prepared as in Example 8 by using a mixture of 100 parts of the composition (E) and 2 parts of "Zelec UN". The SMC was molded and tested for flexural strength, modulus of elasticity in flexure, and I.L.S.S. The results obtained were as shown in Table 11.

TABLE 11

| Ratio (P)/(O) | Easiness on handling | Flexural strength (kg/mm$^2$) | Modulus of elasticity in flexure (kg/mm$^2$) | I.L.S.S. (kg/mm$^2$) | Molding conditions *1, *2 (min.) |
|---|---|---|---|---|---|
| 4/96 | Good | 49.0 | 4000 | 6.5 | 5 |
| 25/75 | Good | 52.0 | 4100 | 8.5 | 5 |
| 65/35 | Good | 53.0 | 4200 | 8.5 | 5 |
| 80/20 | Fair to poor | 53.5 | 4300 | 8.5 | 10 |
| 0/100 | Good | 40.0 | 3700 | 5.0 | 5 |

Note:
*1 Mold temperature: 135° C.; molding pressure: 30 kg/cm$^2$
*2 Post Cure: 130° C., 2 hours

EXAMPLE 11

A mixture of 100 parts of the composition (A) of Example 1 and 3 parts of "Zelec UN" was spread over a sheet of polyethylene film. Carbon fiber "Pyrofil EAS" (Trademark for Mitsubishi Rayon Co.) 10000 fil was arranged in parallel and combined with the spread resin composition. The resulting sheet material was left standing in a tightly closed vessel at 40° C. for 48 hours to obtain a low tackiness sheet containing 60% by weight of unidirectionally arranged carbon fiber. The cured sheet material was tested for flexural strength along the fiber direction, modulus of elasticity in flexure (ASTM D 790-71), and I.L.S.S. (ASTM D 2344-76). The results obtained were as shown in Table 12.

TABLE 12

| Ratio (b)/(a) | Easiness on handling | Flexural strength (kg/mm$^2$) | Modulus of elasticity in flexure (kg/mm$^2$) | I.L.S.S. (kg/mm$^2$) | Molding conditions *1, *2 (min.) |
|---|---|---|---|---|---|
| 4/96 | Good | 160 | 11.0 | 8.8 | 5 |
| 25/75 | Good | 185 | 11.8 | 9.5 | 5 |
| 65/35 | Fair to poor | 190 | 12.0 | 9.8 | 5 |
| 80/20 | Fair to poor | 190 | 12.0 | 9.8 | 10 |
| 0/100 | Good | 140 | 11.0 | 7.0 | 5 |

Note:
*1 Mold temperature: 135° C.; molding pressure 30 kg/cm$^2$
*2 Post Cure: 130° C., 2 hours

EXAMPLE 12

Figure 2:
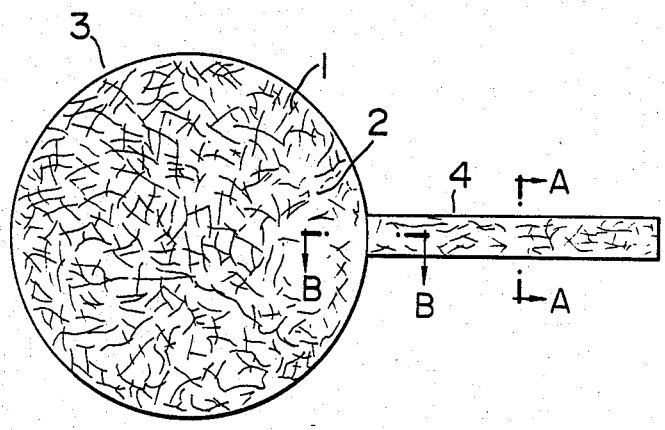
FIG. 2 is a top view of the pressing tool shown in FIG. 1.
Figure 3:
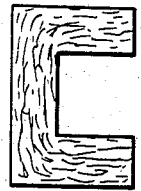
FIG. 3 is a sectional view at A—A of FIG. 2.
Figure 4:
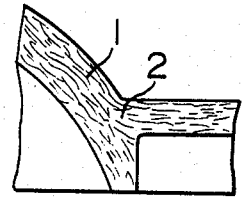
FIG. 4 is a sectional view at B—B of FIG. 2.

A carbon fiber-containing SMC [(P)/(O)=25/75] prepared in Example 10 were charged into a mold for compression molding and cured under application of heat and pressure to obtain a pressing tool for use in roentgenoscopic diagnosis, which is illustrated in FIG. 1 (sectional view) and FIG. 2 (plan). For comparison, specimens of the tool made from the same SMC as that described above but different in thickness and the specimen made from wood were tested for the deflection under load, X-ray transmittance, and weight. The results obtained were as shown in Table 13. The cross section of the arm and the cross section at the joint of semispherical shell to the arm were as shown in FIGS. 3 and 4, respectively.

TABLE 13

| | Material | Wall thickness (mm) | Deflection at the tip under load (mm) | X-ray transmittance relative to wood | Weight (g) |
|---|---|---|---|---|---|
| 1 | Wood | 25 | 0.11 | 1 | 140 |
| 2 | Composition of present invention | 3 | 0.06 | 1 | 140 |
| 3 | | 2 | 0.08 | 0.67 | 80 |

EXAMPLE 13

Figure 5:
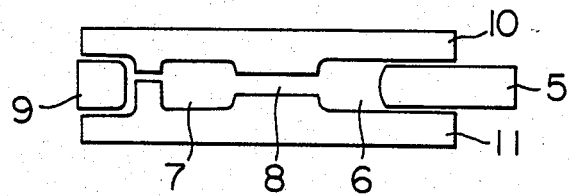
FIG. 5 shows an example of shaping mold in sectional side view.
Figure 6:
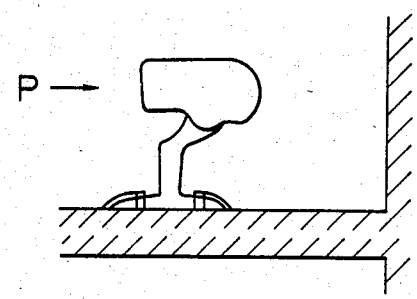
FIG. 6 shows a method for reel testing.
Figure 7:
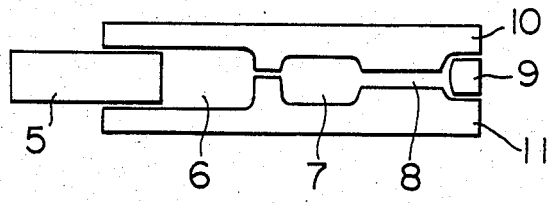
FIG. 7 shows an example of shaping mold (in sectional side view) used in Comparative Example.
Figure 8:
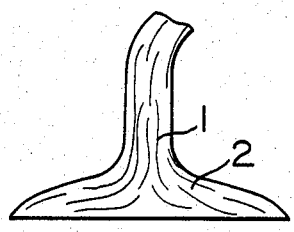
FIG. 8 shows a portion of a molded reel in sectional view.
Figure 9:
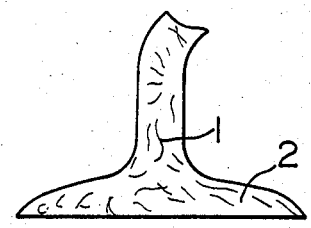
FIG. 9 shows a portion of a reel (in sectional side view) molded in Comparative Example.
Figure 10:
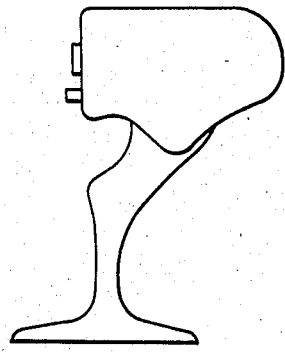
FIG. 10 show a plan view of the main part of a reel.

A part of reel for fishing (FIG. 10) was molded by forcing, under application of a pressure of 50 kg/cm², into a mold of reel the unidirectionally oriented sheet material [(b)/(a)=25/75], prepared in Example 11, from the bottom of leg as shown in FIG. 5, then curing the material at a mold temperature of 145° C. for 3 minutes, and post-curing at 130° C. for 2 hours. The molded reel was subjected to breaking test as shown in FIG. 6. The breaking stress per unit cross-sectional area at the foot of the leg was found to be 25 kg/mm². In another molding test employing a mold shown in FIG. 7, the material was forced under applied pressure from the reel top. Under breaking test, the breaking stress was found to be 15 kg/mm². Observation of the section of leg ascertained as seen from FIGS. 8 and 9, that the orientation of carbon fiber was satisfactory when the material was forced into the mold from the bottom of leg, whereas the orientation was disturbed when charged from the top.

What is claimed is:

1. A resin composition characterized by quick curability and adhesive strength comprising (I) at least one compound selected from the group consisting of:
   (A) unsaturated polyesters containing hydroxyl group which is a polyester of a dibasic carboxylic acid and a dihydroxy compound
   wherein at least a portion of the dibasic carboxylic acid component is
   an unsaturated dibasic carboxylic acid, and
   (B) reaction products of polyepoxides ethylenically unsaturated carboxylic acids in a ratio of 1:0.5 to 1:1 of epoxy groups to carboxylic acid groups,
   (II) at least one monomer copolymerizable with said compound (I), which is selected from the group consisting of ethylenically unsaturated monomers and unsaturated allylic monomers; (III) a peroxide catalyst for the copolymerization of compounds (I) and (II); (IV) at least one compound containing the oxirane ring, (V) a curing agent (excluding acid anhydrides, acids and amine compounds) capable of curing said oxirane compound (IV); and (VI) a catalyst capable of promoting the curing of compounds (IV) and the activity of curing agent (V); (VII) a polyisocyanate compound and (VIII) a promoter for the reaction between isocyanate group and hydroxyl group.

2. A resin composition according to claim 1, wherein the resin composition contains, as component I, the compound (A), which is a polyester of maleic acid and phthalic acid.

3. A resin composition according to claim 1, wherein the resin composition contains, as component I, the compound (B), which is a reaction product between methacrylic acid, acrylic acid, or crotonic acid and a compound selected from the group consisting of polyglycidyl ethers of diphenylolalkanes, polyhydric phenols, and polyglycidyl substituted p-aminophenol, m-aminophenol and polyamines; and epoxides of cycloaliphatic compounds.

4. A resin composition according to claim 1, wherein the component (II) is a compound selected from the group consisting of styrene derivatives, acrylates, methacrylates, and allyl esters.

5. A resin composition according to claim 1, wherein the component (III) is a compound selected from the group consisting of those peroxides which are active at moderate to high temperatures and those peroxides which are active at ordinary to moderate temperatures.

6. A resin composition according to claim 1, wherein the component (IV) is a compound selected from the group consisting of polyglycidyl ethers of diphenylolalkanes, polyhydric phenols and polyamines; epoxides of cycloaliphatic compounds; and the monoepoxy compounds styrene oxide, butyl glycidyl ether, and allyl glycidyl ether.

7. A resin composition according to claim 1, wherein the component (V) is a compound selected from the group consisting of the guanidines dicyandiamide, 2,6-xylenylbiguanide, o-tolyl biguanide, diphenylguanidine, and the hydrazides adipyl dihydrazide and azelayl dihydrazide.

8. A resin composition according to claim 7, wherein the component (VI) is a compound selected from the group consisting of reaction products of dimethylamine and phenylisocyanate or substituted phenyl isocyanate and boron trihalides-amine complexes.

9. A resin composition according to claim 1, wherein the polyisocyanate compound (VII) is selected from the group consisting of the aromatic and aliphatic polyisocyanates 4,4'-diphenylmethanediisocyanate, 2,4-toluenediisocyanate, 2,6-toluenediisocyanate, hexamethylenediisocyanate m-xylylenediisocyanate and polymethylenepolyphenylisocyanate of the formula

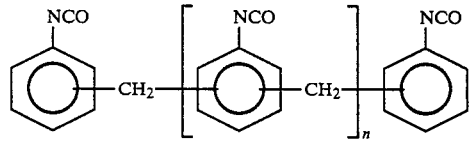

where n=1§10.

10. A resin composition according to claim 1, wherein the promoter (VIII) is selected from the group consisting of the organic tin compounds dibutyltin dilaurate and tin octoate, and the metal naphthenates tin napthenate and cobalt naphthenate.

11. A resin composition according to claim 1, wherein the ratio of the mixture of (I), (II) and (III) to the mixture of (IV), (V) and (VI) is 97–3/3–97.

12. A resin composition according to claim 1, wherein the amount of (VII) relative to the total amount of (I) to (VI) is such that the functional group ratio OH/NCO is 1/0.1–1.

13. A FRP material comprising a reinforcing fiber impregnated with a resin composition according to claim 1.

14. A FRP material according to claim 13, wherein the reinforcing fiber is selected from the group consisting of inorganic fibers including glass fiber, alumina fiber, silicon carbide fiber, boron fiber, and carbon fiber and organic fibers including polyester fiber and polyaramide fiber.

15. A molded product made by the thermal curing of the FRP material according to claim 13.

16. A resin composition according to claim 8, wherein component (I) is a polyester of maleic anhydride, phthalic anhydride and diethylene glycol, component (II) is diallyl phthalate and component (IV) is a bisphenol A glycidyl ether epoxy resin.

17. A resin composition according to claim 8, wherein component (I) is a reaction product of a bisphenol A diglycidyl ether epoxy resin and methacrylic acid, component (II) is styrene and component (IV) is a bisphenol A-diglycidyl ether epoxy resin.

18. A composition according to claim 1, wherein compound (I) is compound I(B) and contains at least three hydroxy groups per molecule and wherein compound (VII) contains at least three-NCO groups per molecule.

19. A composition according to claim 18, wherein compound (IV) is at least one compound containing the oxirane ring and having an average molecular weight of less than 10,000.

20. A resin composition according to claim 1, wherein the ratio of the mixture of (I), (II) and (III) to the mixture of (IV), (V) and (VI) is 97-3/3-97, and wherein the amount of (VII) relative to the total amount of (I) to (VI) is such that the functional group ratio OH/NCO is 1/0.1-1.

21. A resin composition according to claim 20, wherein the ratio of the mixture of (I), (II) and (III) to the mixture of (IV), (V) and (VI) is 97-40/3-60.

* * * * *